United States Patent
John et al.

(10) Patent No.: US 7,926,584 B2
(45) Date of Patent: Apr. 19, 2011

(54) HAND-HELD POWER TOOL WITH AIR SPRING PERCUSSION MECHANISM, LINEAR MOTOR, AND CONTROL PROCESS

(75) Inventors: Alexander John, Rankweil (AT); Bernhard Sander, Munich (DE); Albert Binder, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 193 days.

(21) Appl. No.: 12/229,800

(22) Filed: Aug. 26, 2008

(65) Prior Publication Data

US 2009/0065226 A1   Mar. 12, 2009

(30) Foreign Application Priority Data

Sep. 12, 2007 (DE) .......................... 10 2007 000 488

(51) Int. Cl.
*B25D 13/00* (2006.01)
(52) U.S. Cl. .............................. 173/1; 173/201; 173/212
(58) Field of Classification Search .............. 173/1, 201, 173/212; 310/30, 35, 12; 60/409, 412
See application file for complete search history.

(56) References Cited

U.S. PATENT DOCUMENTS

| 4,553,074 | A | 11/1985 | Jacquemet | |
|---|---|---|---|---|
| 5,497,555 | A | 3/1996 | Averbuch | |
| 6,215,206 | B1 * | 4/2001 | Chitayat | .................... 310/12.14 |
| 6,663,348 | B2 * | 12/2003 | Schwarz et al. | ................. 417/12 |
| 7,025,183 | B2 * | 4/2006 | Steffen et al. | ................. 188/267 |
| 2004/0065455 | A1 * | 4/2004 | Berger et al. | ................. 173/201 |
| 2008/0252150 | A1 | 10/2008 | Grunde | |

FOREIGN PATENT DOCUMENTS

| GB | 1396812 | 6/1975 |
|---|---|---|
| WO | WO 2007/000 344 | 1/2007 |

* cited by examiner

*Primary Examiner* — Rinaldi I Rada
*Assistant Examiner* — Nathaniel Chukwurah
(74) *Attorney, Agent, or Firm* — Abelman, Frayne & Schwab

(57) ABSTRACT

A hand-held power tool (1) includes a linear motor (2) having a rotor (3) which is movable along a percussion axis (A) in an axially limited manner between two reversal points (W) and which can be driven by the striking piston (5) of the power tool with the intermediary of an air spring (4), sensors designed for determining the actual state of the rotor (3) and connected to a computer (9) connected via power electronics (33) to at least one field coil (10) of the linear motor (2), with the rotor (3) being displaced against a contact element (11a, 11b) at least at one reversal point (W) and being pressed against the contact element electromagnetically; and a control process for the hand-held power tool.

23 Claims, 6 Drawing Sheets

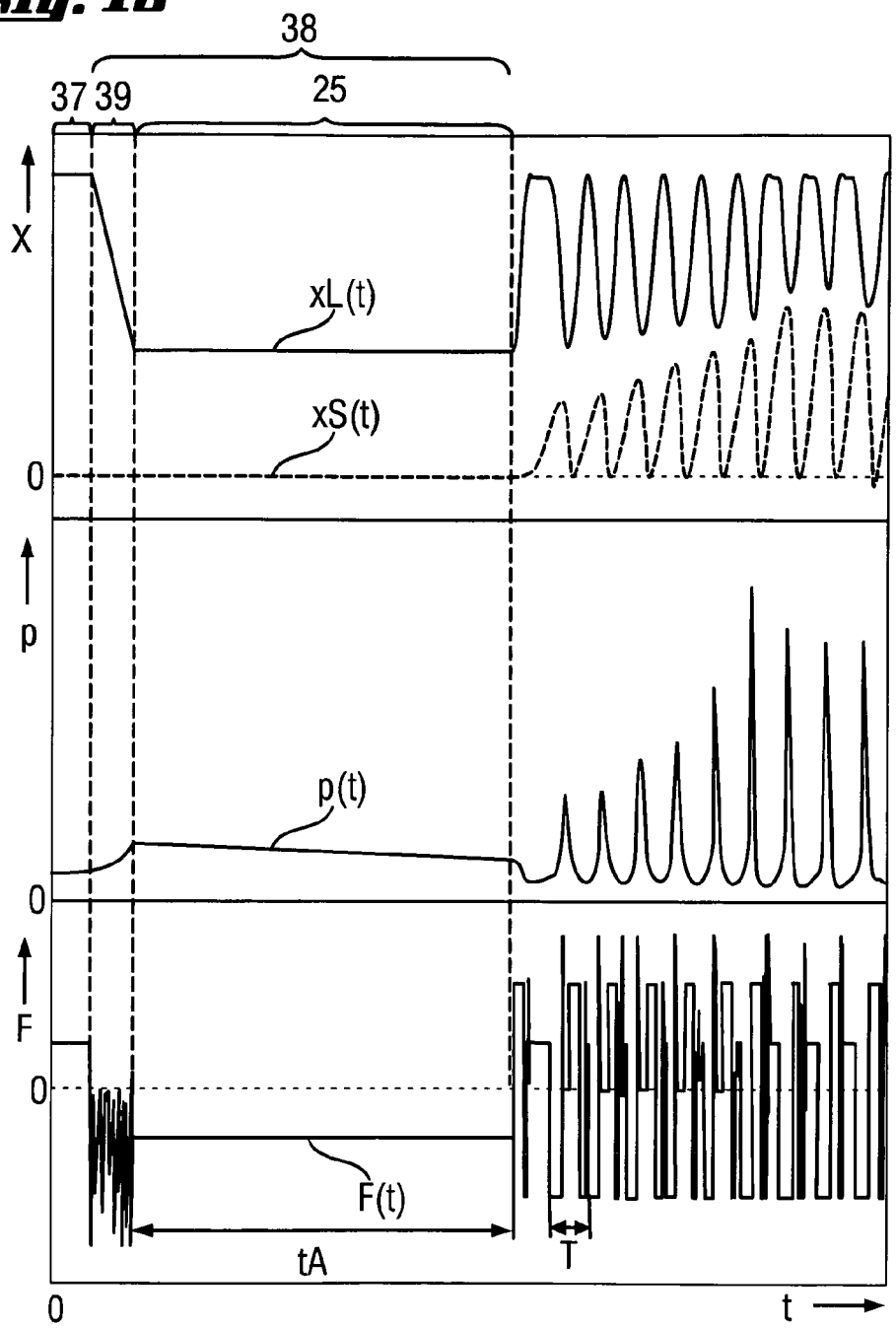

HAND-HELD POWER TOOL WITH AIR SPRING PERCUSSION MECHANISM, LINEAR MOTOR, AND CONTROL PROCESS

BACKGROUND OF THE INVENTION

1. Field of the Invention

The invention relates to a hand-held power tool with an air spring percussion mechanism which is driven by a linear motor, such as a hammer drill or chisel hammer, and to an associated control process.

2. Description of the Prior Art

For the proper use of percussion hand-held power tools, a stable percussion operation must be ensured over all load ranges and also the transition from percussion operation to impactless idle stroke operation must be ensured when the tool is lifted from a workpiece. Reliable operation of the hand-held percussion power tool must be ensured under every operating condition that is selected in practice by the user. In particular, the following operating conditions can be specified by the user:

the hand-held power tool is switched off and the linear motor is not in operation; the linear motor is in operation, but the tool is not in contact with the workpiece;

the linear motor is in operation and the tool is placed against the workpiece;

the linear motor is only put into operation when the tool has been placed against the workpiece;

the linear motor is in operation and the hand-held power tool is in a stable percussion state;

the linear motor is in operation and the tool is guided just over the workpiece (floating chiseling);

the linear motor is in operation and the tool is removed far away from the workpiece;

the hand-held power tool is switched off while the tool is placed against the workpiece.

In a hand-held power tool with a linear motor according to British Patent GB 1,396,812, the soft-magnet rotor of the linear motor is constructed directly as a striking piston. The rotor impacts directly on the power tool-side end surface of a working tool or an anvil. U.S. Pat. No. 4,553,074 discloses an associated method for controlling the linear motor.

According to European Publication EP 1,472,050, the soft-magnet rotor of the controlled linear motor is constructed as a driving piston of a striking piston that is connected with the driving piston by an air spring. Through the control of the rotor, the air spring percussion mechanism can be stopped electrically when the tool is lifted from the workpiece, without the need for an idle stroke path of the striking piston, which idle path stroke is controlled by the displacement of the tool and which mechanically opens the relatively wide ventilation openings to the air spring. Besides the field coil, a holding coil is also needed for holding the rotor in a reference position or idle stroke position. The reference position and idle stroke position can be identical.

According to International Publication WO 2007 000344, an air spring is formed at both sides of the rotor. The rotor which accordingly constantly swings back and forth between two air springs can be accelerated and braked electromagnetically. A pressure peak of varying intensity, depending on the percussion mechanism, operating condition or tool interaction, will occur in the piston-side air spring when the driving piston and striking piston approach one another. On the one hand, however, this pressure peak generates a force which accelerates the striking piston and enables it to strike the tool but, on the other hand, it substantially influences the movement of the mechanically axially freely movable driving piston, especially when this driving piston is constructed as a light structural component so that it can be accelerated back and forth with little energy. The fact that there is no positive guidance of the driving piston carried out by a mechanism in the kinematics of the driving piston impedes a stable regulation of the movement of the rotor that is constructed as a driving piston because the reversal points of the movement are not identically positioned in every stroke period. Whereas the rotor could be fixed magnetically by a holding coil at a reference position in the exhausted state (due to frictional attenuation) over a plurality of movement periods, this could not happen within the same movement periods with the high kinetic-energy rotor because of inertia. Therefore, even when an additional holding coil is used, the problem of the absence of a mechanical positive guidance of the rotor and the problem of reversal points that are not identically spatially positioned still persist.

Further, in an air spring percussion mechanism according to European Publication EP 0 718075, a linear motor directly drives the driving piston in that the latter is connected to the rotor of the linear motor by an axially limited loose coupling. According to German Publication DE 10 2005 017483, the rotor of the single-phase or multiphase linear motor has a plurality of permanent magnets with alternating polarity which are axially offset at a determined pole distance and with which are associated in each instance yokes of a comb-toothed stator. The loose coupling does occasionally cause a decoupling of the complex kinematics, but at the expense of an additional regulation of the coupling process itself; in particular, the rotor must be additionally accelerated and braked.

SUMMARY OF THE INVENTION

It is the object of the invention to realize a hand-held power tool with an air spring percussion mechanism driven by a linear motor that is robust under real-life operating conditions, and an associated control method.

Accordingly, a hand-held power tool with a linear motor has a rotor which is movable along a percussion axis in an axially limited manner between two reversal points and which can be driven by the striking piston with the intermediary of an air spring, wherein sensors which are designed for determining the actual state of the rotor, are connected to computing means which are connected via power electronics to at least one field coil of the linear motor, and wherein the rotor can be displaced toward a contact element at least at one reversal point and can be pressed against it electromagnetically.

In that the rotor is pressed electromagnetically against a mechanical contact element, at least one spatially identically positioned initial position (namely, a reversal point) of the rotor is realized for every movement period so that the control process controlling this is simpler and more robust than when the reversal point of the movement of the (noncontacting) rotor is not fixed and the kinematics is accordingly highly complicated.

When a rotor is constructed with permanent magnets which alternate periodically in axial pole pitch and with associated poles of the stator, it is advantageous in order to prevent the rotor from getting caught in a force gap that the reversal point (and, in a corresponding manner, the associated contact) of the rotor is arranged in a starting position which is located outside of the force gap position in which the motor force on the rotor is zero even when the field coil is energized, and, further advantageously, is displaced therefrom by slightly less than one fourth of the pole pitch. Accordingly, the movement of the rotor can always be reliably started.

The starting position of the rotor is also advantageously a locking position in which the locking force on the rotor is not equal to zero when the field coil is not energized, and the rotor accordingly presses against the contact element so that the rotor is reliably held at the contact element even when the field coil is not energized.

A bearing element near the striking piston is advantageously provided for the rotor so as to prevent impermissible positions.

The contacts are advantageously made of a cross-linked elastomer, more advantageously, of a silicon rubber, so that they are resistant to high temperatures and fatigue.

A mechanical lock-in mechanism, which is connected to the computing means for being controlled thereby, is advantageously provided for the rotor which is secured at the rear contact element in the vicinity of the stator, so that the position of the rotor is fixed when no current is supplied when the linear motor is switched off.

The guide tube advantageously has a narrow blowhole to ensure a constant air volume in the air spring averaged over the movement periods.

At least one relatively large ventilation opening is advantageously provided which is offset on the tool side relative to the blowhole. While always closed by the striking piston during stable percussion operation, this ventilation opening is open toward the air spring when the tool is offset on the tool side (when the tool is lifted far away from the workpiece) by the tool-side displacement of the striking piston into an idle stroke position. Thus, the percussion mechanism is turned off when the tool is lifted far away from the workpiece. The ventilation opening for venting the air spring can be closed exclusively on the inner side by the striking piston (passively) or, additionally, on the outer side by a displaceable control sleeve (actively).

In the associated control process for a hand-held power tool with a linear motor having a rotor which drives the striking piston along the percussion axis with the intermediary of an air spring and can be reciprocated in a controlled manner at least in stable percussion operation between a front reversal point near the striking piston and another, rear reversal point, a delay step, in which the rotor moving toward the striking piston is delayed electromagnetically, is carried out at least in a further operating state other than that of the stable percussion operation, within the movement period.

In the stable percussion operation, a pressure peak develops in the air spring as the rotor approaches the striking piston. As a result of this, due to its small mass, the rotor is inevitably braked in its forward movement and reverses, even when the motor force is set to maximum forward feed. If this pressure peak is absent in a further operating state (idle stroke) or is too weak, the position of the front reversal point can be actively influenced by the delay step, which position otherwise depends primarily on the pressure developing in the air spring and would vary sharply in an uncontrolled manner. The decision criteria for actively delaying the rotor are based on data acquired by sensors such as, e.g., the actual movement status $l(x(t), v(t), a(t))$ of the rotor at time t or the pressure p in the air spring.

Based on (preset or calculated) data of a kinematic reference movement state $S(x(t+\Delta t), v(t+\Delta t), a(t+\Delta t))$ of the rotor at time $t+\Delta t$, in an energizing step, the computer means advantageously calculates the necessary current to be supplied to the field coil(s) in order to achieve this state and energizes the field coil(s) via the power electronics. For this purpose, the computing means uses stored integrated motor models for the motor characteristic or resorts to measurement data arrays of the motor characteristics which are stored in memory, and interpolates them.

When the rotor is designed with permanent magnets which alternate periodically in axial pole pitch and with associated poles of the stator, the energizing step advantageously includes a pole phase calculation step which calculates the pole phase within the pole pitch from the position of the rotor, so that the periodicity of the motor characteristic can be used in the energization calculation, and the motor model or measurement data array is reduced.

In an advantageous manner, the acceleration with constant motor force in each instance is carried out at least in the operating state of stable percussion operation during the forward feed and backward feed, and the field coils are energized with a current strength which is constant with respect to quantity in the energizing step so that a high impact frequency is achieved. Further, alternately switched currents generate only low heat losses in the power electronics and require only two heavy-duty potentials.

The delay step is advantageously preceded by a calculation step which calculates a delay time, at which the delay step is initiated, from sensor-acquired data of the kinematic actual movement state $l(x(t), v(t), a(t))$ of the rotor by the computing means so that the delay step (by itself) can be controlled over time t as a parameter. The calculated delay time ensures that the rotor reverses at a predetermined front reversal point. In so doing, the computing means uses stored integrated calculation models for the delay process or resorts to measurement data arrays of the delay process stored in memory and interpolates them.

In an advantageous manner, a contact step, in which the rotor approaches a contact element at a reversal point and is temporarily held at the latter electromagnetically, is carried out at least in the operating state of stable percussion operation in every movement period. Accordingly, even vibrations cannot change the defined position of the rotor.

In the contact step, the rotor advantageously approaches the rear contact element and is temporarily held there electromagnetically so that the striking piston is already drawn into the starting position for the next impact.

In an advantageous manner, at least in a still further state (starting, stopping, idle stroke operation) other than that of the stable percussion operation, a contact step, in which the rotor approaches a contact element at the front reversal point and is temporarily held there electromagnetically, is carried out in every movement period. Impermissible positions of the rotor can be prevented in this way. A number of measurement parameters can be used for detecting the idle stroke event deviating from the stable percussion operation due to the absence of braking by the pressure peak and for detecting the subsequent active contact of the rotor at the front contact element, in particular:

The rotor exceeds a critical speed or kinetic energy at a given location or cycle time.

The rotor exceeds a critical path absolutely or at a given cycle time.

The striking piston exceeds a critical path absolutely or at a given cycle time.

The air spring falls below a critical pressure at a given cycle time.

At a given cycle time, the percussion mechanism falls below a critical supplied energy which can be calculated when the motor voltage or motor current and the rotor speed or force acting on the rotor (e.g., by estimation using the motor current) are known.

In the transition from non-operation or an idle stroke operation to the stable percussion operation, in a suction step for drawing in the striking piston which has just ceased to be located in the idle stroke position, there is advantageously carried out, within the first movement period, a contact step at the front contact which is followed by a holding step for a blow-off period that is longer than a period of the stable percussion operation and, also advantageously, shorter than ten periods so that the excess air in the air spring is blown off via the blowhole.

In the transition to non-operation which is controlled by the hand switch (actuated by the user), a contact step is advantageously carried out at the rear contact followed by a lock-in step which mechanically locks in the rotor at the rear contact element, so that the air spring is vented via the blowhole in a rest period (depending on the user). Conversely, an unlocking step for mechanically unlocking the rotor is firstly carried out during the transition from non-operation.

The contact step advantageously includes a braking step with a (movement)-delaying motor force, in which the rotor gently approaches the contact element, and a holding step occurring later in time with a (movement) accelerating motor force in which the rotor is temporarily held there so that the two steps can be controlled separately.

The braking step is advantageously preceded by a calculation step in which the computing means calculates a braking time from sensor-acquired data of the kinematic actual movement state $(x(t), v(t), a(t))$ of the rotor, at which braking time, the braking step is initiated so that the braking process (by itself) is controllable over time t as a parameter. The calculated braking time ensures that the rotor only strikes the contact element gently at a low final speed (<2 m/s). The computing means uses stored integrated calculation models for the braking process or resort to measurement data arrays of the braking process stored in memory and interpolates them.

In an advantageous manner, the speed and the position of the kinematic actual movement state of the rotor are acquired by sensors as variables of the calculation step. Of course, quantities derived from these variables such as energy and so on can also be used. For this purpose, it is sufficient, for example, to acquire the passage time of the rotor with two axially offset sensors. Of course, other sensor arrangements suitable for this purpose can also be used.

The braking step advantageously comprises a force control loop for regulating the motor force required for a uniform approach speed (to the contact) so that the increased friction values can be compensated for in the braking step particularly when the hand-held power tool is still cold. For this purpose, it is sufficient, for example, to acquire a plurality of passage times of the rotor with an axial sensor array positioned at the contact element. Of course, other sensor arrangements suited to this purpose can also be used.

The holding step is advantageously preceded by a trigger step in which a trigger condition for the holding time from sensor-acquired data of the kinematic actual movement state $(x(t), v(t), a(t))$ of the rotor is calculated by the computing means, at which holding time the holding step is initiated so that the holding process (by itself) is controllable over time t as a parameter.

A speed threshold and/or a position threshold of the kinematic actual movement state of the rotor are/is advantageously acquired by sensors as variable(s) of the trigger step. Of course, quantities derived therefrom such as energy and so on can also be used. For this purpose, it is sufficient, for example, to acquire the passage time of the rotor by a sensor positioned in the vicinity of the contact element. Of course, other sensor arrangements suitable for this purpose can also be used.

The novel features of the present invention which are considered as characteristic for the invention, are set forth in the appended claims. The invention itself both to its construction and its mode of operation, together with additional advantages and objects thereof, will be best understood from the following detailed description of preferred embodiment, when read with reference to the accompanying drawings.

BRIEF DESCRIPTION OF THE DRAWINGS

The invention will be described more fully with reference to an advantageous embodiment example.

The drawings show:

FIG. 10 blow off diagram; and

FIG. 11 a flowchart illustrating a non-operational state of the power tool.

DETAILED DESCRIPTION OF THE PREFERRED EMBODIMENTS

Figure 1:
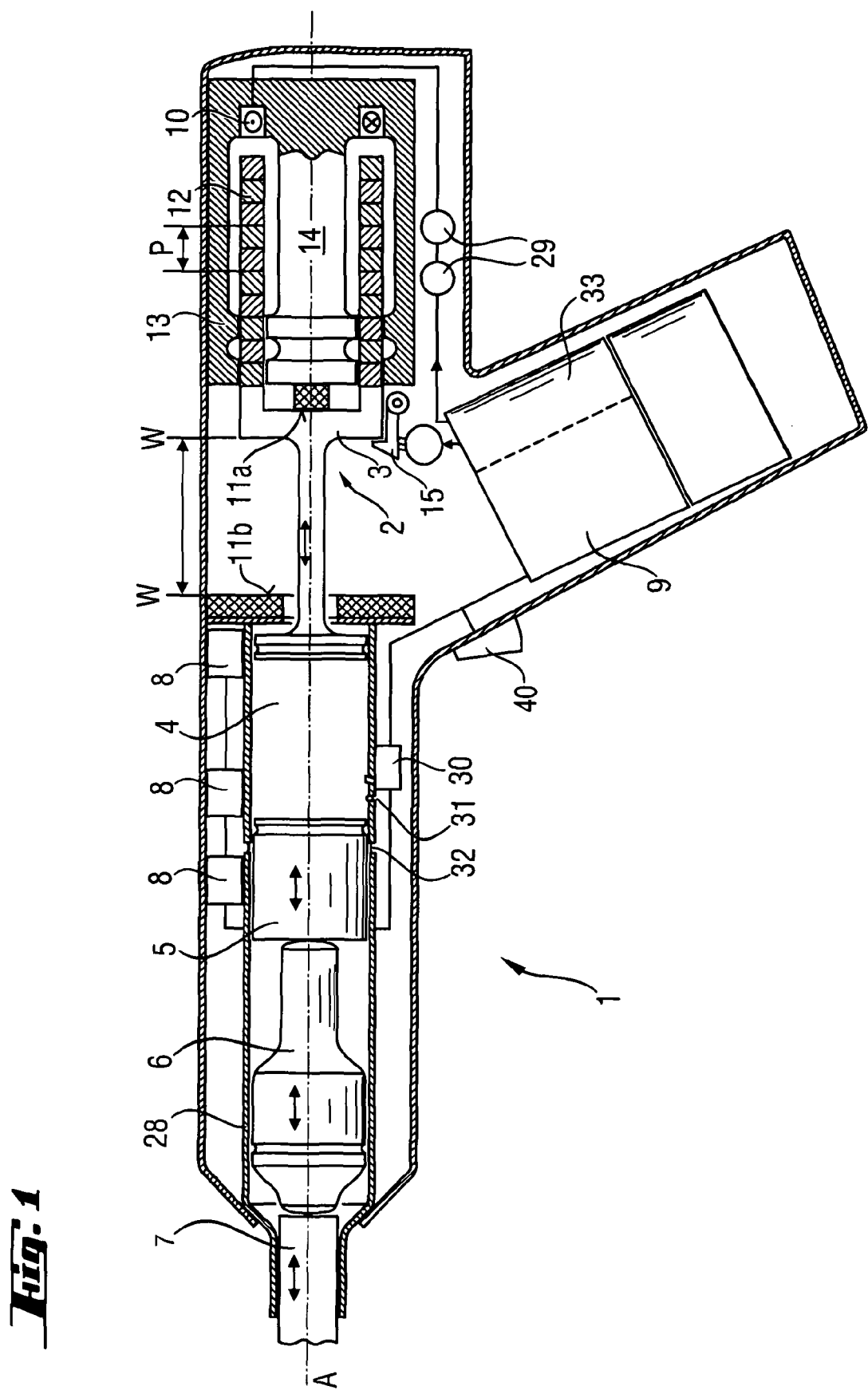
FIG. 1 a side, cross-sectional view of a hand-held power tool according to the present invention.

According to FIG. 1, a hand-held power tool 1, which applies blows along a percussion axis A, includes a linear motor 2 with at least one field coil 10 and whose rotor 3, which is movable in a limited manner axially between two reversal points W, drives a striking piston 5 via an air spring 4. The striking piston 5 applies blows to located axially downstream, impact means in the form of an anvil 6 which applies blows to a tool 7. Sensors designed for determining the actual movement state $l(x(t), v(t), a(t))$ of the rotor 3 and of the striking piston 5 in the form of, respectively, an axially oriented Hall sensor array 8 for detecting the position of the rotor 3 and striking piston 5, current and voltage sensors 29 for the field coil 10, and a pressure sensor 30 that opens toward the air spring 4 are connected via electronic computing means 9 with power electronics 33 to the field coil 10 of the linear motor 2. The rotor 3 is displaceable, within the two reversal points W located at a distance of 4 mm apart against a contact element 11a, 11b, respectively, made of a cross-linked elastomer in the form of silicon rubber and, as is shown, makes electromagnetic contact against the rear contact element 11a under compressive pretensioning. The rotor 3 is constructed with permanent magnets 12 which alternate periodically at an axial pole pitch P, and with associated poles 13 of the stator 14. Further, a mechanical lock-in mechanism 15 in the form of a catch hook is provided for the rotor 3 which is held at the rear reversal point W at the rear contact element 11a and which is connected in a control manner to the computing means 9. The air spring 4 is formed in such a way that the rotor 3 and the striking piston 5 are guided coaxially with low friction in a temporarily air-tight guide tube 28. Further, the air spring 4 has a narrow blowhole 31 which provides for a constant average air volume in the air spring 4. The wide ventilation openings 32 which are closed by the striking piston 5 in the stable percussion operation (as is shown) serve for fast venting of the air spring 4 and therefore for turning off the percussion mechanism when the tool 7 and the anvil 6 travel forward, with the tool 7 being lifted far away from the workpiece.

Figure 2:
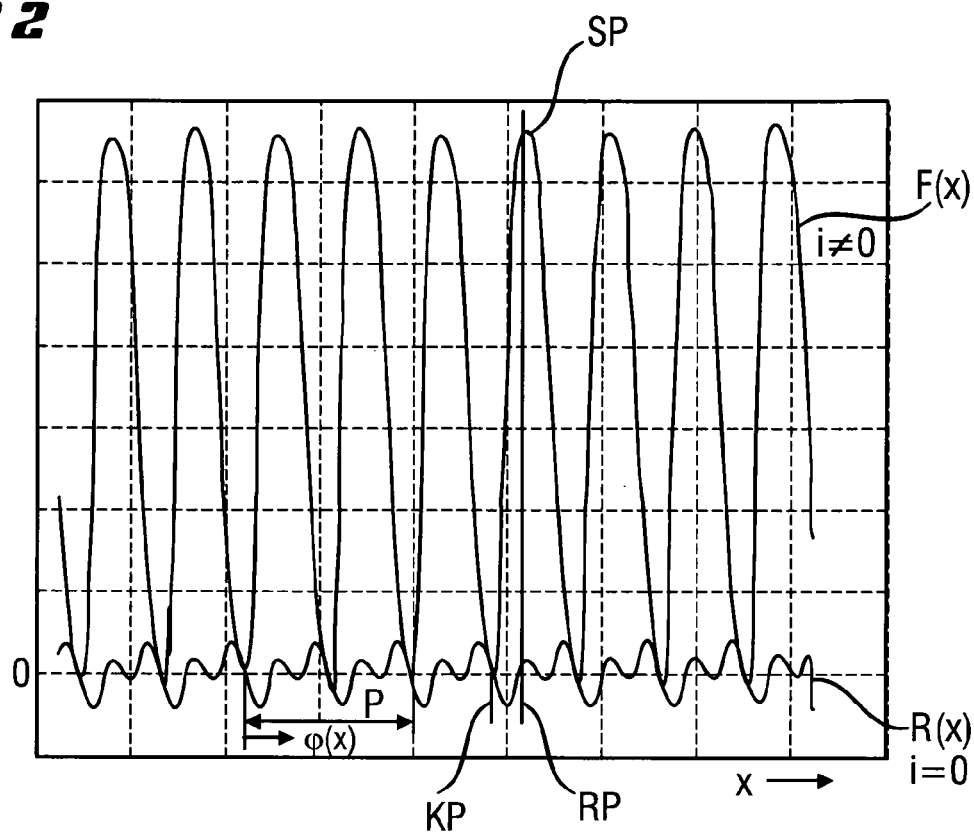
FIG. 2 a diagram illustrating a motor characteristic.

FIG. 2 shows the motor characteristic of the motor force F(x) and the locking force R(x) for a rotor 3 (FIG. 1) with permanent magnets 12 (FIG. 1) alternating periodically at an axial pole pitch P and with associated poles (FIG. 1) of the stator 14 (FIG. 1). To prevent the rotor 3 (FIG. 1) from hanging in a force gap with motor force F(x)=0, the reversal point W (FIG. 1) and, in a corresponding manner, the associated contact element 11a, 11b (FIG. 1) of the rotor 3 (FIG. 1) are arranged in a starting position SP lying outside of the force gap position KP at which the motor force F(x) on the rotor 3 (FIG. 1) is always zero even when the field coil 10 (FIG. 1) is energized (i not equal to 0) in that it is offset therefrom in a pole phase φ(x) by slightly less than one fourth of the pole pitch P. The starting position SP forming a reversal point W (FIG. 1) is at the same time also a lock position RP in which the locking force R(x) on the rotor 3 (FIG. 1) is not equal to zero when the field coil 10 (FIG. 1) is not energized i=0 and presses against the contact element 11 (FIG. 1). The motor force F(x) also changes direction with the direction of the current strength i.

Figure 3:
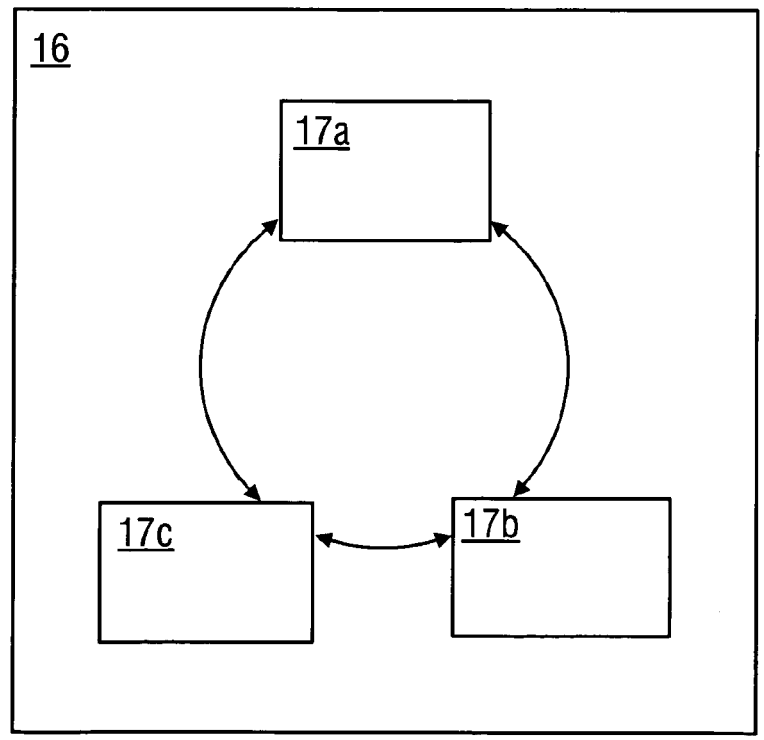
FIG. 3 a schematic diagram illustrating a control process according to the present invention.

According to the power tool state diagram in FIG. 3, the control process 16 for a percussion hand-held power tool 1 (FIG. 1), which forms as an algorithm for the computing means 9 (FIG. 1), has a plurality of selectable (directly by the user or indirectly by the boundary conditions) operating states 17a, 17b, 17c, namely, the stable percussion operation 17a with active linear motor 2 (FIG. 1) and with the tool 7 placed against the workpiece or guided just above the workpiece (floating chiseling) (FIG. 1), the idle stroke operation 17b with active linear motor 2 (FIG. 1) and with the tool 7 at a great distance from the workpiece (FIG. 1), and non-operation 17c with the linear motor 2 (FIG. 1) not activated. It is possible to change between any of the operating states 17a, 17b, 17c in either direction.

Figure 4:
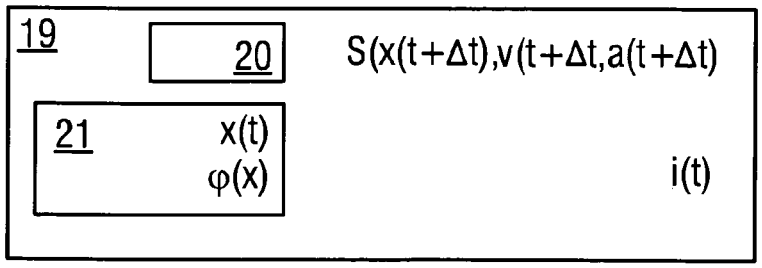
FIG. 4 a flowchart illustrating the energizing step of the control process.

According to FIG. 4, there is repeated within the algorithm an energizing step 19 which determines, from previously calculated or stored data of a kinematic reference movement state S(x(t+Δt), v(t+Δt), a(t+Δt)) of the rotor 3 (FIG. 1) at time t+Δt, the current strength i(t) of the field coil(s) 10 (FIG. 1) of the linear motor 2 (FIG. 1) which is required for achieving this and which flows from the power electronics 33 (FIG. 1) controlled by the field coil(s) 10 (FIG. 1) and brings about the necessary motor force F(x(t)) (FIG. 2). For this purpose, the computing means 9 (FIG. 1) resorts to a measurement data array 20 (FIG. 8) of the percussion mechanism characteristic stored in the memory and interpolates it. With the construction of the rotor 3 (FIG. 1) shown in FIG. 1, the energizing step 19 has, in addition, a pole phase calculation step 21 which calculates the pole phase φ(x) within the pole pitch P from the position x(t) of the rotor 3 (FIG. 1). For this purpose, the computing means 9 (FIG. 1) models the motor characteristic (FIG. 2) through simple trigonometric functions over the pole phase φ(x). The necessary current strength i(t) for generating the motor force F(x(t)) (FIG. 2) by energizing through the field coil(s) 10 (FIG. 1) is determined in accordance with the given pole phase φ(x).

Figure 5:
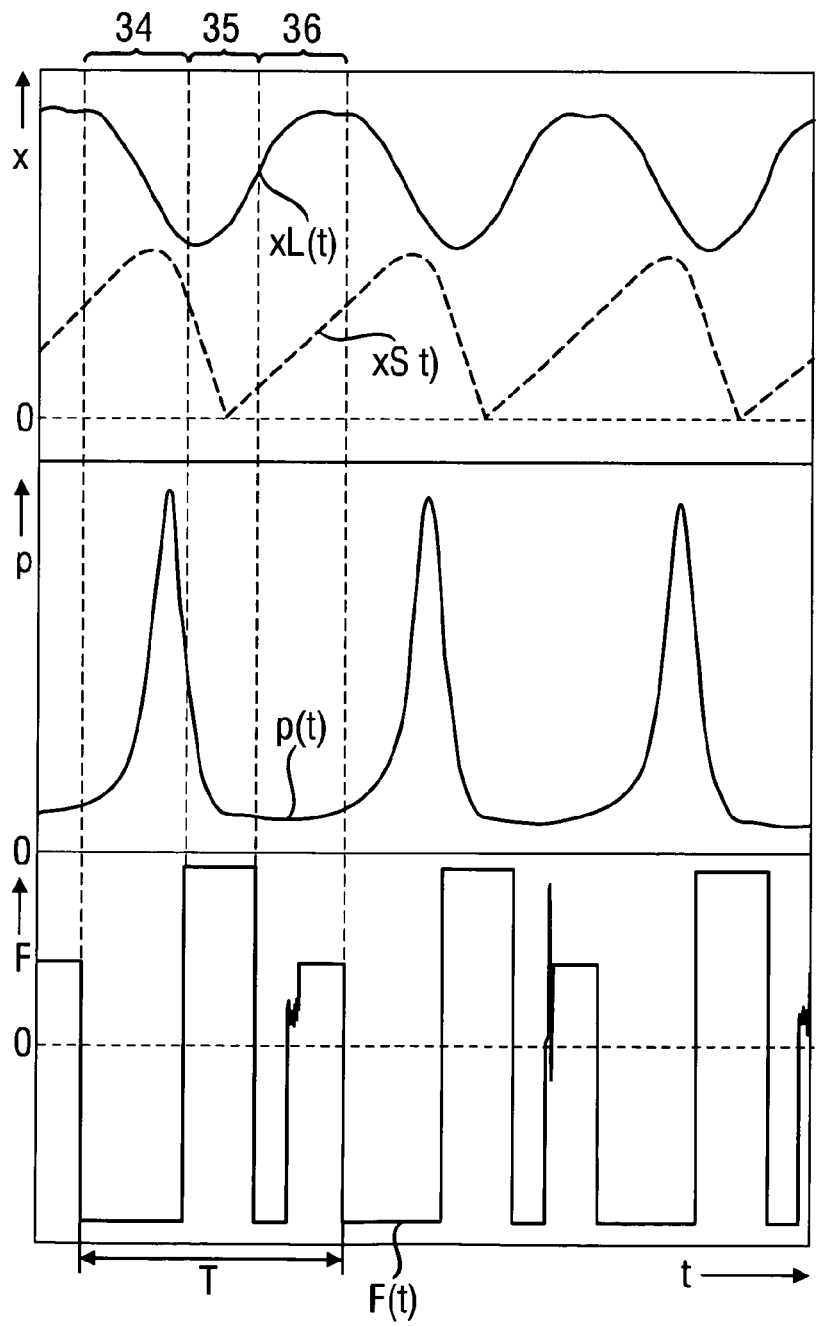
FIG. 5 a diagram illustrating a stable percussion operation of the power tool.

The rotor position xL(t), the striking piston position xS(t), the air spring pressure p(t), and the motor force F(t) are shown in a suitably scaled manner over time t in FIG. 5 in the operating state 17a (FIG. 3) of the stable percussion operation in which the rotor 3 (FIG. 1) is reciprocated in a controlled manner between a front reversal point W (FIG. 1) in the vicinity of the striking piston 5 (FIG. 1) and a rear reversal point W (FIG. 1) remote of the striking piston 5 (FIG. 5). A forward feed 34 of the rotor 3 (FIG. 1) at constant motor force F(t) is carried out within every movement period of period duration T. The reversal of the movement causes the pressure peak at maximum pressure p(t) in the air spring 4 (FIG. 1) is detected by sensors and communicated to the computing means 9 (FIG. 1). The return feed 35, which directly follows the forward feed 34, is carried out with the inverse identical amount of constant motor force F(t). As is shown by the kink in the striking piston position xS(t), the force impact of the striking piston 5 (FIG. 1) on the anvil 6 (FIG. 1) is carried out shortly thereafter. Since the operating state 17a (FIG. 2) of the stable percussion operation is accordingly flexible with respect to relatively short displacements (10 mm) of the anvil 5 (FIG. 1), floating chiseling is also possible. Further, a contact 36 takes place in every movement period, with the rotor 3 (FIG. 1) approaching the rear contact element 11a by a contact step 23 (FIG. 9) and being temporarily held there electromagnetically so that the mechanical contact 36 simultaneously defines rear reversal point W (FIG. 1) of the movement.

Figure 6:
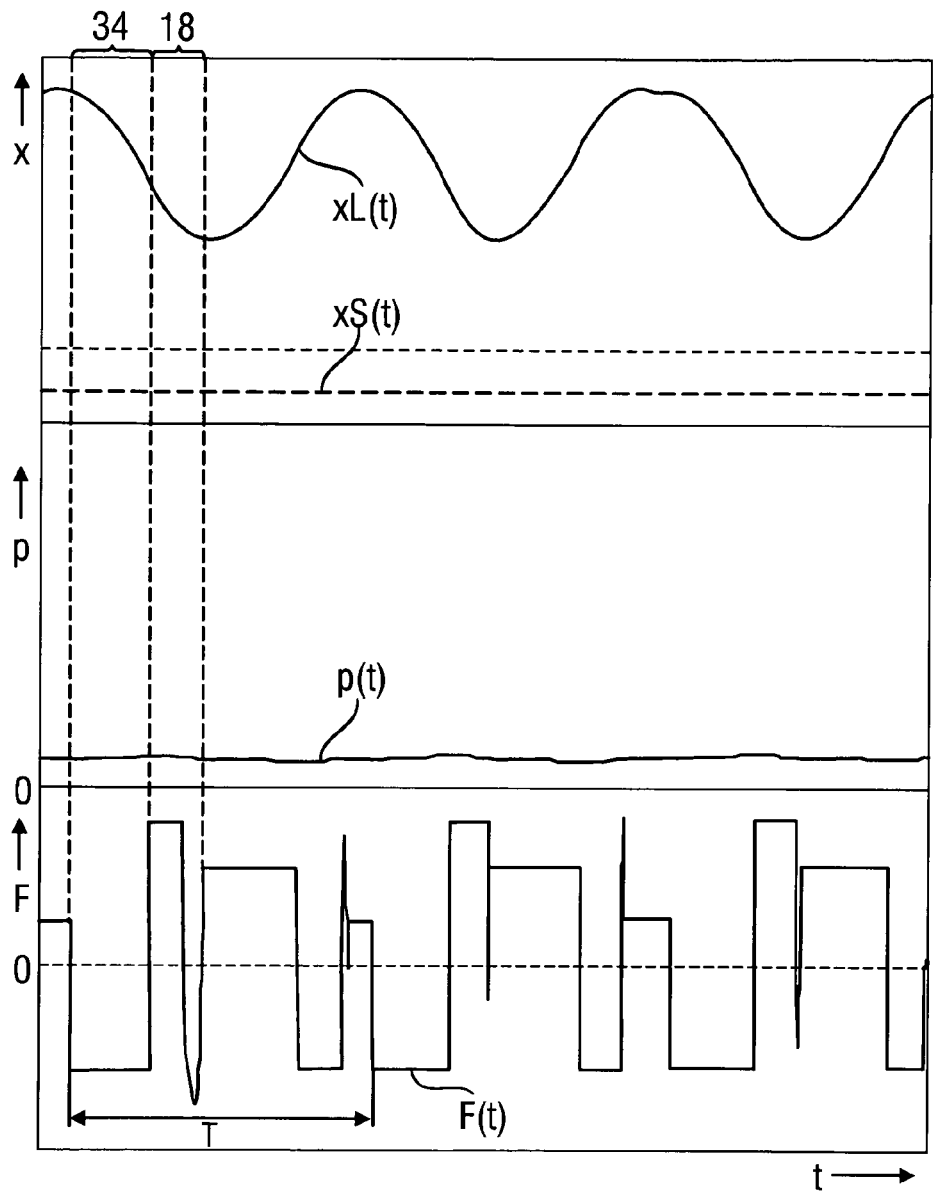
FIG. 6 a diagram illustrating an idle stroke operation.

The rotor position xL(t), the striking piston position xS(t), the air spring pressure p(t), and the motor force F(t) are shown in a suitably scaled manner over time t in FIG. 6 in an operating state 17b (FIG. 3) another than the state 17a of the stable percussion operation, in the form of the idle stroke operation in which, due to the tool 7 (FIG. 1) being displaced far forward, the striking piston 5 (FIG. 1) is displaced far forward (not shown), and the ventilation opening 32 (FIG. 1) is open. After the forward feed 34, a delay step 18 in which the rotor 3, which is (FIG. 1) movable toward the striking piston 5 (FIG. 1), is delayed electromagnetically, is carried out within the movement period T.

Figure 7:
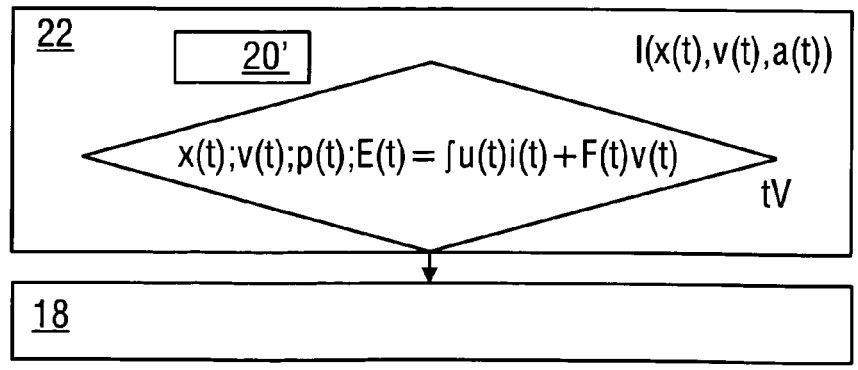
FIG. 7 a flowchart illustrating a calculation step.

According to FIG. 7, the delay step 18 is preceded, in the algorithm, by calculation step 22 which calculates a delay time tV at which the delay step 18 is initiated from sensor-acquired data of the kinematic actual movement state l((x(t), v(t), a(t)) of the rotor 3 (FIG. 1) by the computing means 9. The calculated delay time tV ensures that the rotor 3 (FIG. 1) reverses shortly before or at a preset front reversal point W (FIG. 1). For this purpose, the computing means 9 (FIG. 1) resorts to measurement data arrays 20' (FIG. 8) of the delay process which are stored in the memory and interpolates them. The transition of the operating state 17a (FIG. 3) of the stable percussion operation to the further operating state 17b (FIG. 3) in the form of the idle stroke operation, and vice versa, is selected automatically by the computing means 9 (FIG. 1) when one of the following idle stroke conditions is present and, conversely in a corresponding manner, the transition of the operating state 17b (FIG. 3) of the idle stroke operation to the operating state 17a (FIG. 3) in the form of the stable percussion operation is selected when none of the following idle stroke conditions is present:

The rotor 3 (FIG. 1) exceeds a critical speed v(t) at a given location x(t) or time t.

The striking piston 5 (FIG. 1) exceeds a critical path x(t) absolutely or at a given time t.

The rotor 3 (FIG. 1) exceeds a critical path x(t) absolutely or at a given time t.

The air spring 4 (FIG. 1) falls below a critical pressure p(t) at a given time t.

At a given time t, the linear motor 2 (FIG. 1) falls below a critical supplied energy E(t) which is calculated from the voltage u(t) and the current strength i(t) through the field coils 10 and the motor force F(t) and the speed v(t) of the rotor 3 (FIG. 1) by the computing means 9 (FIG. 1) through numerical integration of the sum of the product terms u(t)i(t) and F(t)v(t) over a period T (FIG. 6), i.e., 0.02 s, for example.

Figure 8:
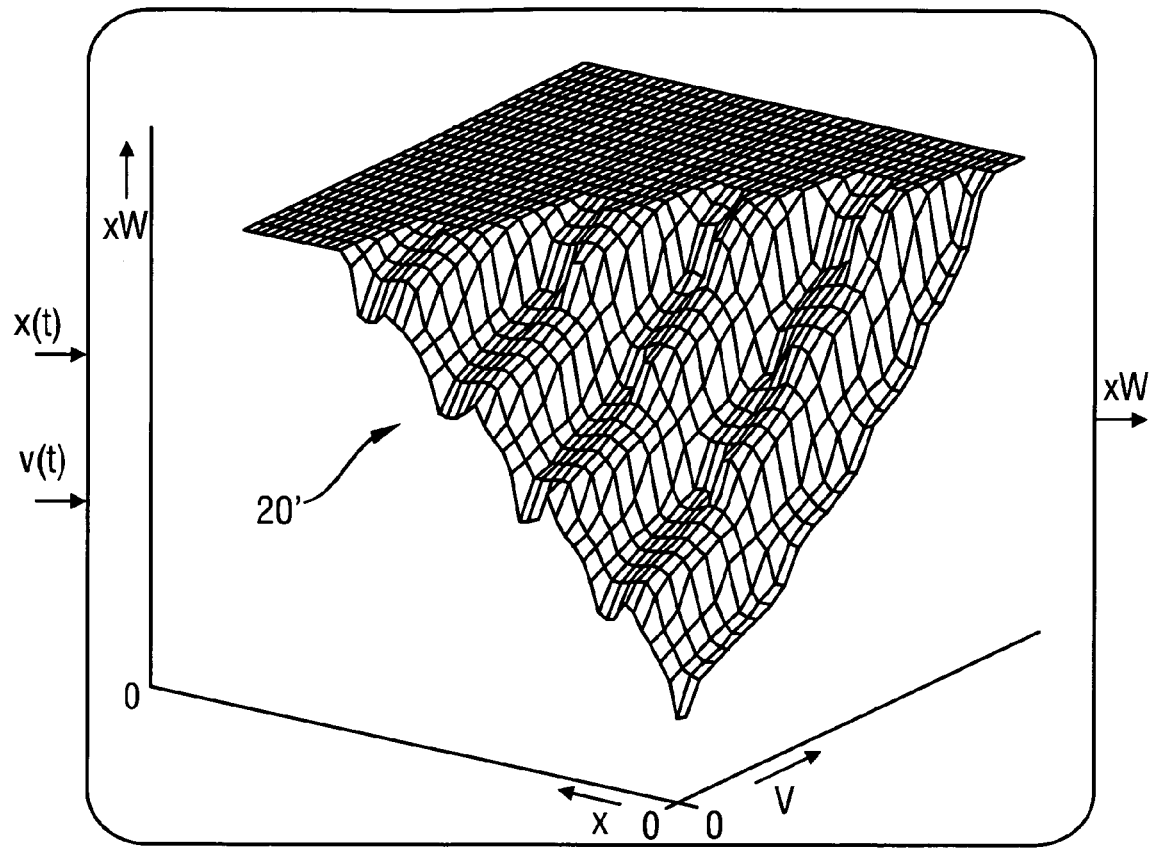
FIG. 8 a diagram illustrating a measurement data array.

According to FIG. 8, the measurement data array 20' of the delay process which is stored in the memory of the computing means 9 (FIG. 1) contains as input variables the sensor-acquired rotor position x(t) and the rotor speed v(t) and, as output value, the calculated position xW of the front reversal point W (FIG. 1). The clearly discernable waviness results in the pole pitch P (FIG. 4) of the rotor 3 (FIG. 1). The plateau shows the position of the front contact element 11b (FIG. 1) just before the reversal point W (FIG. 1) is constrained through the delay.

Figure 9:
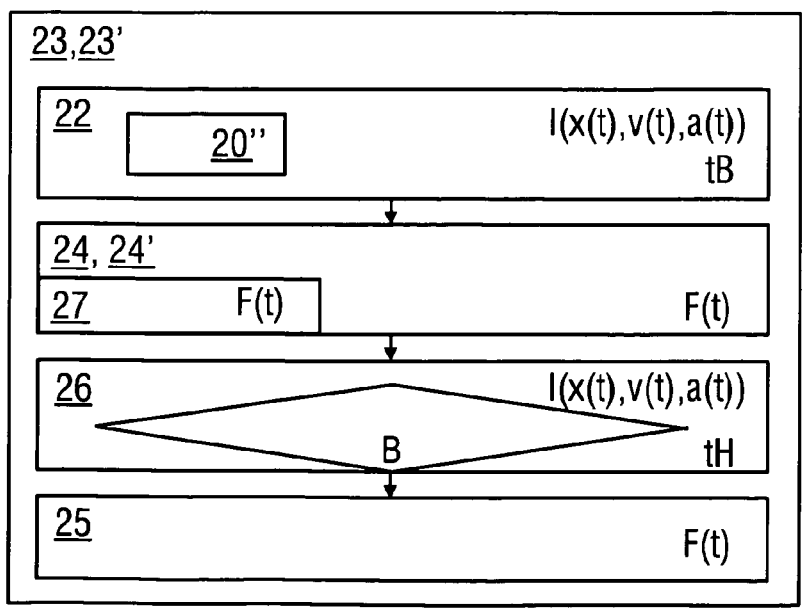
FIG. 9 a flowchart illustrating the contact step of the control process.

According to FIG. 9, the contact step 23, 23' has a braking step 24 with the motor force F(t) delaying the movement of the rotor 3 (FIG. 1), in which the rotor 3 (FIG. 1) gently approaches the contact element 11a, 11b (FIG. 1). Further, the contact step 23, 23' has a holding step 25 occurring later in time with a movement-accelerating motor force F(t) in which the rotor 3 (FIG. 1) is held there temporarily. The braking step 24 is preceded by a calculation step 22' which calculates a braking time tB at which the braking step 24 is initiated from sensor-acquired data of the kinematic actual movement state (x(t), v(t), a(t)) of the rotor 3 (FIG. 1) by the computing means 9 (FIG. 1). The computing means 9 (FIG. 1) resorts to the measurement data array 20" (analogous to FIG. 8) of the braking process stored in memory and interpolates it. For this purpose, the speed v(t) and the position x(t) of the kinematic actual movement state l((x(t), v(t), a(t))) of the rotor 3 (FIG. 1) are acquired by sensors as variables of the calculation step 24, with two axially offset sensors 8 (FIG. 1) in the form of the axial sensor array acquiring the passage time of the rotor 3 (FIG. 1). For this purpose, the holding step 25 is preceded by a trigger step 26 which calculates a trigger condition B for the holding time tH at which the holding step 25 is initiated from sensor-acquired data of the kinematic actual movement state (x(t), v(t), a(t)) of the rotor 3 (FIG. 1). A speed v(t) and/or a position x(t) of the kinematic actual movement state (x(t), v(t), a(t)) of the rotor 3 (FIG. 1) are/is acquired by sensors as a variable of the trigger step 26 and compared to a speed threshold and/or a position threshold. For this purpose, the axial sensor array 8 (FIG. 1) acquires the passage time of the rotor 3 (FIG. 1) by a sensor positioned in the vicinity of the contact element 11a, 11b (FIG. 1). Further, the braking step 24, 24' includes a force control loop 27 for regulating the motor force F(t) required for a uniform smooth approach speed v(t) to the contact element 11a, 11b (FIG. 1). For this purpose, the axial sensor array acquires a plurality of passage times of the rotor 3 (FIG. 1) with a plurality of sensors 8 (FIG. 1) positioned at the contact element 11a, 11b (FIG. 1).

According to FIG. 10, the rotor position xL(t), the striking piston position xS(t), the air spring pressure p(t), and the motor force F(t) are shown in a suitably scaled manner over time t in the transition from non-operation 17c (FIG. 3) to stable percussion operation 17a (FIG. 3). After an unlocking step 37 for unlocking the rotor 3 (FIG. 1) from the lock-in means 15 (FIG. 1) in a draw-in step 38 for drawing in the striking piston 5 (FIG. 1) which has just ceased to be located in the front striking position within the first movement period, a contact step 39 of the rotor 3 (FIG. 1) at the front contact element 11b (FIG. 1) is carried out, followed by a holding step 25 for a blow-off time tA comprising seven periods T of the stable percussion operation 17a (FIG. 3).

According to FIG. 11, in the transition to non-operation 17c (FIG. 4) which is controlled by the hand switch 40 (FIG. 1) (actuated by the user), a contact step 23 is carried out at the rear contact element 11a (FIG. 1) followed by a lock-in step 41 which mechanically locks in the rotor 3 (FIG. 1) at the rear contact element 11a (FIG. 1). Sometime later, an unlocking step 42 is first carried out in the transition from non-operation 17c (FIG. 3) to stable percussion operation 17a (FIG. 3) or idle stroke operation 17b (FIG. 3), which transition is controlled by the (user-actuated) hand switch 40 (FIG. 1).

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A method of controlling a hand-held power tool including a striking piston (5) for applying blows to a working tool (7), a linear motor (2) for driving the striking piston (5) and including a rotor (3) displaceable axially along a percussion axis (A), and an air spring (4) located between the striking piston (5) and the rotor (3), the method comprising the steps of displacing the rotor (3), in a first operating state (17a) that corresponds to a stable percussion operation between a front, in an operational direction of the power tool, reversal point (W) located near the striking piston (5) and a rear reversal point (W) spaced from the front reversal point; displacing the rotor (3) toward the striking piston (5) in an operating state (17b) other than the first operating state (17a) and which includes a delay step (18) in which the rotor movement toward the striking piston (5) is delayed electromagnetically; and a calculating step (22) that precedes the delay step (18) and in which computing means (9) of the power tool calculates a delay time (tV) at which the delay step (18) is initiated from sensor-acquired data of a kinematic actual movement state (l(x(t), v(t), a(t)) of the rotor (3).

2. A hand-held power tool, comprising a striking piston (5) for applying blows to a working tool (7); a linear motor (2) for driving the striking piston (5) and including a rotor (3) displaceable axially along a percussion axis (A), within certain limits, between two reversal points (W) and adapted to be driven by the striking piston (5), and a field coil (10), the rotor (3) being displaceable against a contact element (11a, 11b) at least at one of the two reversal points (W) and being pressed there against electromagnetically; an air spring (4) located between the striking piston (5) and the rotor (3); computing means (9) for controlling operation of the linear motor (2) in accordance with an actual state of the rotor (3); sensor means for determining the actual state of the rotor (3) and connected with the computing means (9); and power electronics (33) for connecting the computing means (9) with the field coil (10) of the linear motor (2), wherein there are provided front (11b) and rear (11a) contact elements and wherein the power tool comprises a mechanical lock-in mechanism (15) which is connected in a control manner to the computing means (9) for locking the rotor (3) when the rotor contacts the rear contact element (11a).

3. A hand-held power tool according to claim 2, wherein the linear motor (2) comprises a stator (14) having a plurality of poles (13), and the rotor (3) has a plurality of permanent magnets (12) which alternate periodically by an axial pole pitch (P) and alternate with associated poles (13) of the stator (14), and wherein in order to prevent the rotor (3) from hanging in a force gap, the at least one of the two reversal point (W) is arranged in a starting position (SP) of the rotor (3) located outside of a force gap position (KP) of the rotor (3) in which a motor force (F(t) acting on the rotor (3) is zero even when the field coil (10) is energized.

4. A hand-held power tool according to claim 3, wherein the starting position (SP) is also a locking position (RP) in which a locking force (R(t)) acting on the rotor (3) is not equal to zero when the field coil (10) is not energized, and the rotor (3) presses against the contact element (11a, 11b).

5. A hand-held power tool according to claim 2, wherein the contact element is a front, in an operational direction of the power tool, contact element (11b).

6. A hand-held power tool according to claim 5, wherein the contact element (11a, 11b) is made of an elastomer.

7. A hand-held power tool according to claim 2, comprising a guide tube (28) in which the striking piston (5) and the air spring (4) are located, and wherein the guide tube (28) has a relatively narrow blowhole (31) for the air spring (4).

8. A hand-held power tool according to claim 7, characterized in that at least one relatively large ventilation opening (32) is provided in the guide tube (28) so as to be offset on the tool side relative to the blowhole (31), the at least one ventilation opening (32) being always closed by the striking piston (5) during a stable percussion operation, but being open toward the air spring (4) when the working tool (7) is offset on a power tool side by displacement of the striking piston (5) into an idle stroke position.

9. A hand-held power tool according to claim 2, wherein the mechanical contact element (11a, 11b) is located in a plane extending transverse to the percussion axis.

10. A method of controlling a hand-held power tool including a striking piston (5) for applying blows to a working tool (7), a linear motor (2) for driving the striking piston (5) and including a rotor (3) displaceable axially along a percussion axis (A), and an air spring (4) located between the striking piston (5) and the rotor (3), the method comprising the steps of displacing the rotor (3), in a first operating state (17a) that corresponds to a stable percussion operation between a front, in an operational direction of the power tool, reversal point (W) located near the striking piston (5) and a rear reversal point (W) spaced from the front reversal point; displacing the rotor (3) toward the striking piston (5) in an operating state (17b) other than the first operating state (17a) and which includes a delay step (18) in which the rotor movement toward the striking piston (5) is delayed electromagnetically; and an energizing step (19) in which the computing means calculates, based on data of a kinematic reference movement state (S(x(t+Δt), v(t+Δt), a(t+Δt))) of the rotor at time (t+Δt), a necessary current to be supplied to a field coil (10) of the linear motor (2) in order to achieve a kinematic movement state corresponding to a kinematic reference movement state, and energizes the field coil (10) via a power electronics (33).

11. A method according to claim 10, wherein the rotor (3) is designed with permanent magnets (12) which alternate periodically by an axial pole pitch (P) and with associated poles (13) of a stator (14) of the linear motor (2), and wherein the energizing step (19) has a pole phase calculation step (21) in which a pole phase (φ(t)) within the pole pitch (P) from a position (x(t)) of the rotor (3) is calculated.

12. A method according to claim 10 wherein at least in the operating state (17a) of stable percussion operation, acceleration (a(t)) with a constant motor force (F(t)) in each instance is carried out during forward feed (34) and return feed (35), and the field coil (10) is energized in the energizing step (19) with a constant current strength (i(t)).

13. A method according to claim 10, comprising a contact step (23) in which the rotor (3) approaches a contact element (11a, 11b) at one of the reversal points (W) and is temporarily held at the latter electromagnetically, and which is carried out at least in the operating state (17a) of the stable percussion operation in every movement period.

14. A method according to claim 13, wherein in the contact step (23), the rotor (3) approaches the rear contact element (11a) and is temporarily held there electromagnetically.

15. A method according to claim 10, wherein at least in the other operating state (17b), a contact step (23), in which the rotor (3) approaches a contact element (11b) at the front reversal point (W) and is temporarily held there electromagnetically, is carried out in every movement period.

16. A method according to claim 10, wherein during a transition to the stable percussion operation, a draw-in step (38) for drawing in the striking piston (5) which has just ceased to be located in an idle stroke position and in which, there is carried out, within a first movement period, a contact step (23) at the front contact (11b) which is followed by a holding step (25) for a blow-off period (tA) that is longer than a period (T) of the stable percussion operation.

17. A method according to claim 10, wherein in the transition to non-operation which is controlled by a hand switch (40), a contact step (23) is carried out at the rear contact element (11b) followed by a lock-in step (41) in which the rotor (3) is locked mechanically at the rear contact element (11b).

18. A method according to claim 17, wherein the contact step (23) has a braking step (24) with a delaying motor force (F(t)), in which the rotor (3) gently approaches the contact element (11a, 11b), and a holding step (25) occurring later in time with an accelerating motor force (F(t)) in which the rotor (3) is temporarily held there.

19. A method according to claim 18, wherein the braking step (24) which is preceded by a calculation step (22, 22') in which the computing means (9) calculates a braking time (tB) from sensor-acquired data of a kinematic actual movement state (l(x(t), v(t), a(t))) of the rotor (3) at which braking time (tB) the braking step (24) is initiated.

20. A method according to claim 19, wherein speed (v(t)) and position (x(t)) of the kinematic actual movement state (l(x(t), v(t), a(t))) of the rotor (3) are acquired by sensors as variables of the calculation step (22, 22').

21. A method according to claim 18, wherein the braking step (24) comprises a force control loop (27) for regulating the motor force (F(t)) required for a uniform approach speed.

22. A method according to claim 18, wherein the holding step (25) is preceded by a trigger step (26) in which a trigger condition (B) for the holding time (tH) from sensor-acquired data of a kinematic actual movement state (l(x(t), v(t), a(t))) of the rotor (3), at which holding time (tH) the holding step (25) is initiated.

23. A method according to claim 22, wherein speed threshold and/or position threshold of the kinematic actual movement state (l(x(t), v(t), a(t))) of the rotor (3) are/is acquired by sensors as variable of the trigger step (26).

* * * * *